(12) United States Patent
Ogishima (10) Patent No.: US 8,355,156 B2
(45) Date of Patent: Jan. 15, 2013

(54) IMAGE FORMING APPARATUS AND METHOD FOR CONTROLLING THE ORDER OF EXECUTION OF PRINT JOBS

(75) Inventor: Takuya Ogishima, Shizuoka (JP)

(73) Assignee: Toshiba Tec Kabushiki Kaisha, Tokyo (JP)

(*) Notice: Subject to any disclaimer, the term of this patent is extended or adjusted under 35 U.S.C. 154(b) by 772 days.

(21) Appl. No.: 12/511,579

(22) Filed: Jul. 29, 2009

(65) Prior Publication Data

US 2010/0027069 A1 Feb. 4, 2010

(30) Foreign Application Priority Data

Jul. 31, 2008 (JP) ................................. 2008-198097

(51) Int. Cl.
*G06K 15/00* (2006.01)
(52) U.S. Cl. ...................... 358/1.16; 358/1.15; 358/1.14; 358/1.1; 726/4; 713/182; 399/80; 399/79
(58) Field of Classification Search .......................... None
See application file for complete search history.

(56) References Cited

U.S. PATENT DOCUMENTS

2005/0200885 A1* 9/2005 Nishizawa et al. .......... 358/1.15
2007/0024892 A1* 2/2007 Cho .............................. 358/1.14

FOREIGN PATENT DOCUMENTS

| JP | 2000-177212 | 6/2000 |
|---|---|---|
| JP | 2005-109843 | 4/2005 |
| JP | 2007-098590 | 4/2007 |
| JP | 2008-060691 | 3/2008 |
| JP | 2008-217511 | 9/2008 |

OTHER PUBLICATIONS

Japanese Office Action for Application No. 2009-178331 mailed on Nov. 29, 2011.

* cited by examiner

*Primary Examiner* — Benny Q Tieu
*Assistant Examiner* — Paul F Payer
(74) *Attorney, Agent, or Firm* — Turocy & Watson, LLP (57) ABSTRACT

An image forming apparatus includes a job memory which stores each of image formation jobs, which are received from terminals, in association with a user identifier which identifies a user of a corresponding terminal, an image forming unit which executes the image formation jobs which are stored in the job memory, a user detector which detects a user identifier of each approaching user, and a controller which calculates, upon detection of plural user identifiers by the user detector, elapsed times from reception times of image formation jobs which are stored in the job memory in association with the user identifiers, compares the elapsed times, and controls the image forming unit to preferentially execute the image formation job with a shortest one of the elapsed times.

19 Claims, 8 Drawing Sheets

| JobID | Reception time | Terminal ID | User ID | Print data | Status |
|---|---|---|---|---|---|
| J00001 | 12:23:34 | 001 | 01234567 | DATA1 | Printing mode |
| J00002 | 12:23:40 | 003 | 01239876 | DATA2 | Print-standby mode |
| J00003 | 12:23:48 | 005 | 01231234 | DATA3 | Detection mode |
| ⋮ | ⋮ | ⋮ | ⋮ | ⋮ | ⋮ |

| Detection mode time | T |
|---|---|

IMAGE FORMING APPARATUS AND METHOD FOR CONTROLLING THE ORDER OF EXECUTION OF PRINT JOBS

CROSS-REFERENCE TO RELATED APPLICATION

This application is based upon and claims the benefit of priority from prior Japanese Patent Application No. 2008-198097, filed Jul. 31, 2008, the entire contents of which are incorporated herein by reference.

TECHNICAL FIELD

The present invention relates to an image forming apparatus, such as a printer or a multi-function peripheral, which performs an image forming process in response to an image formation request from each of terminals which are connected over a network.

BACKGROUND

There is a type of conventional image forming apparatus, such as a printer or a multi-function peripheral, which has a so-called network print function and performs a printing process (image forming process) in response to a print request (image formation request) from each of terminals which are connected over a network. By making use of the network print function, a single image forming apparatus can advantageously be shared by a plurality of terminals.

In general, this type of image forming apparatus, however, spools print requests from the terminals in a job storage as print jobs (image formation jobs), and performs printing processes for the print jobs in the order of reception. Thus, if a terminal user has delayed in going for a printed matter that is a print result, it is possible that the printed matter is taken away by a third person. In addition, it is difficult to ensure the confidentiality of the printed matter.

To cope with this problem, there is known a conventional image forming apparatus which includes a user detector for detecting user information of an approaching user and a function of preferentially executing, when the user information of the approaching user is detected by the detector, a job with respect to which the same user information as the user information of the approaching user is set. By using this function, the approaching user can collect a newly output printed matter as his/her own printed matter (see, for instance, Jpn. Pat. Appln. KOKAI Publication No. 2007-098590).

However, the conventional image forming apparatus having the function of preferentially executing the job of the approaching user has the following technical problem that has to be solved. Specifically, in a case where there are users approaching to the image forming apparatus, the conventional function executes jobs in the order of detection by the user detector. In this case, even if no significant difference is present between the timings that the users have approached the image forming apparatus, the elapsed time from the issuance of a print request from the terminal differs for each user.

In general, a user, who has instructed the output of a printed matter with urgency (which may include confidentiality), immediately approaches the image forming apparatus after a print request, and confirms the printed matter. On the other hand, most of users, who have instructed the output of printed matters without urgency, do not immediately go for them after print requests. However, if a user X, who immediately comes for a printed matter, and a user Y who, after a while, comes for a printed matter, approach the image forming apparatus together, and if the user information of the user Y is first detected, the printed matter of the user Y is first output, and the user X has to wait until the printed matter of the user Y is printed out.

SUMMARY

The present invention has been made in consideration of the above-described circumstances, and the object of the invention is to provide an image forming apparatus and a control method thereof, which can enhance usability by reducing a wait time of a user with urgency.

According to an aspect of the present invention, there is provided an image forming apparatus comprising: a job memory which stores each of image formation jobs, which are received from terminals, in association with a user identifier which identifies a user of a corresponding terminal; an image forming unit which executes the image formation jobs which are stored in the job memory; a user detector which detects a user identifier of each approaching user; and a controller which calculates, upon detection of plural user identifiers by the user detector, elapsed times from reception times of image formation jobs which are stored in the job memory in association with the user identifiers, compares the elapsed times, and controls the image forming unit to preferentially execute the image formation job with a shortest one of the elapsed times.

According to another aspect of the present invention, there is provided a control method of an image forming apparatus including a job memory which stores each of image formation jobs, which are received from terminals, in association with a user identifier which identifies a user of a corresponding terminal; an image forming unit which executes the image formation jobs which are stored in the job memory, the method comprising: detecting a user identifier of each approaching user; calculating, upon detection of plural user identifiers, elapsed times from reception times of image formation jobs which are stored in the job memory in association with the user identifiers; comparing the elapse times; and controlling the image forming unit to preferentially execute the image formation job with a shortest one of the elapsed times.

With the image forming apparatus and control method thereof, when plural user identifiers are detected, elapsed times from reception times of image formation jobs which are stored in the job memory in association with the user identifiers are calculated and compared. Then, the image forming unit is controlled to preferentially execute the image formation job with a shortest one of the elapsed times. Therefore, the wait time of the user with urgency can be reduced, and the usability of the image forming apparatus can be enhanced.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION

A network printer system according to an embodiment of the present invention will now be described with reference to the accompanying drawings. This network printer system is used in order to execute a printing process (image forming process) in accordance with print requests (image formation requests) from a plurality of terminals which are connected over a network.

Figure 1:
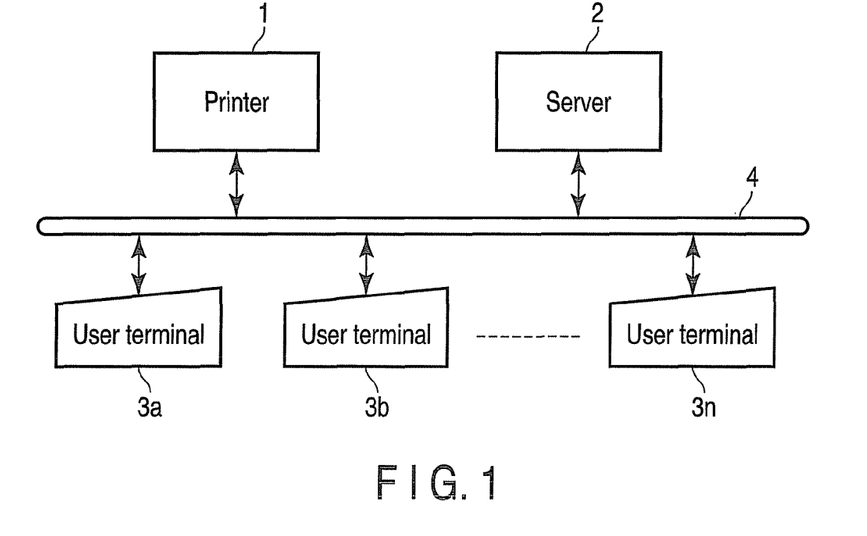
FIG. 1 shows the entire structure of a network printer system according to an embodiment of the present invention.

FIG. 1 shows the entire structure of the network printer system. The network printer system comprises a printer 1 which serves as an image forming apparatus, a server 2, and n user terminals 3 (3a, 3b, ..., 3n). The printer 1 is connected to the server 2 and user terminals 3 via the network 4 such as a LAN (Local Area Network). The printer 1 functions as a network printer.

The server 2 has a function of a printer server. Specifically, the server 2 has a function of collectively receiving print requests from the entire network 4, and sequentially feeding out the print requests to the printer 1. The function of the printer server may be integrated in the printer 1, and the server 2 may be dispensed with.

Each of the user terminals 3 includes a display unit, an operation unit and a processing unit, and is composed of, for instance, a personal computer. Each user terminal 3 specifies the user by login. Specifically, each user terminal 3 includes an input reception unit for receiving a user ID, and receives the user ID input at the time of login. If the user ID is input via the operation unit, user authentication is executed. If the user ID is approved, login is executed for connection to the network 4. After the login, if the operation unit is operated for printing of data, each user terminal 3 sends a print request command via the network 4.

Figure 2:
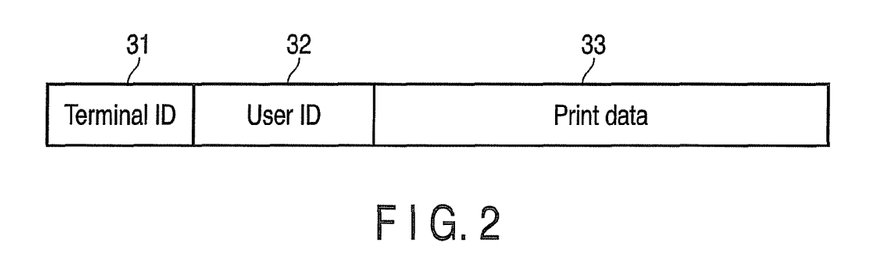
FIG. 2 is a schematic diagram showing the data structure of a print request command which is sent from a user terminal shown in FIG. 1.

FIG. 2 schematically shows the data structure of the print request command. As shown in FIG. 2, the print request command comprises a terminal ID 31, a user ID 32 and print data 33. The terminal ID 31 is an ID for communication, which is set for each user terminal 3 to identify the user terminal 3 on the network 4. The printer 1 and server 2 use the terminal ID to determine which one of the user terminals 3 has sent the print request command. The user ID 32, which has been input at the time of login, is used.

Figure 3:
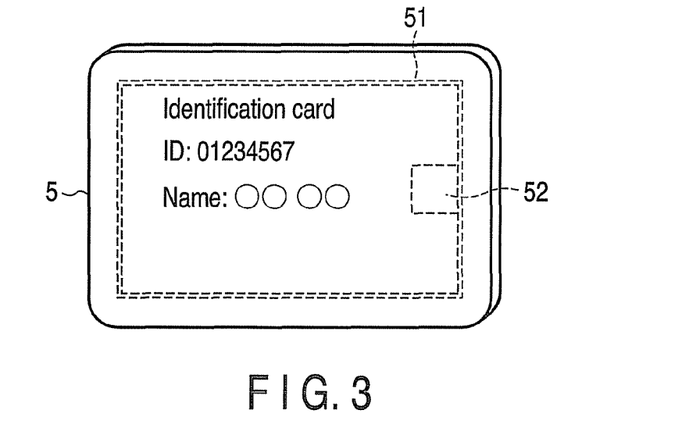
FIG. 3 is a schematic diagram showing an identification card which is carried by each user of the printer shown in FIG. 1.

In the present embodiment, it is presupposed that an identification card 5, as shown in FIG. 3, is carried by each user who uses the user terminal 3. The identification card 5 is composed of an RFID (radio frequency identification) card in which an RFID tag is built in a card body. The RFID tag comprises an antenna 51 and an IC chip 52. The RFID tag is a passive-type RFID tag which is configured such that the IC chip 52 is driven by making use of power of a carrier wave which is sent from an RFID interrogator 18 (to be described later), and data stored in a memory of the IC chip 52 is transmitted. The memory of the IC chip 52 stores the user ID of the user himself/herself who carries the identification card 5.

Figure 4:
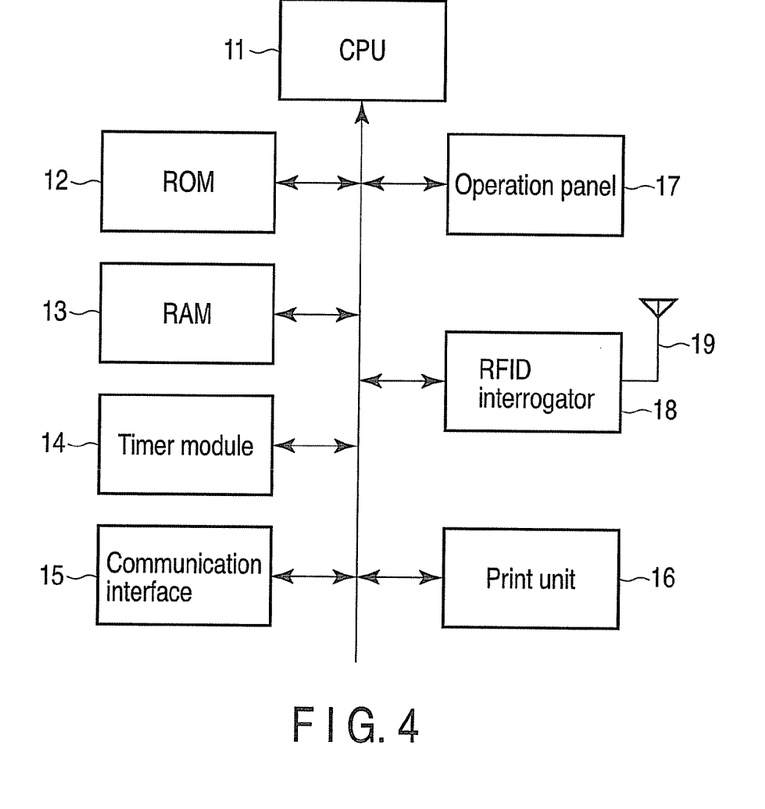
FIG. 4 is a block diagram showing the main structure of the printer shown in FIG. 1.

FIG. 4 shows the main structure of the printer 1. The printer 1 comprises a CPU 11 (Central Processing Unit) 11, a ROM (Read Only Memory) 12, a RAM (Random Access Memory) 13, a timer module 14, a communication interface 15, a print unit 16, an operation panel 17, and an RFID interrogator 18 which communicates with the RFID tag to read or write data.

The CPU 11 performs an overall control of the printer 1. The ROM 12 stores programs such as an operating system (OS) and an application program. The RAM 13 stores various kinds of variable data. The timer module 14 measures the present time. The communication interface 15 is connected to the network 4. The print unit 16 forms, under the control of the CPU 11, an image, which corresponds to print data, on a print medium such as paper. The print unit 16 is composed of, for instance, a laser printer. The operation panel 17 includes hard keys, such as numeral keys, and a display for displaying messages, etc.

The RFID interrogator 18 is composed of a baseband unit, a transmitter unit and a receiver unit. The transmitter unit and receiver unit are connected to an antenna 19 via a circulator. The antenna 19 is attached to the body of the printer 1.

The baseband unit handles a signal before modulation and a signal after demodulation. The transmitter unit generates a non-modulated wave and a modulated wave as transmission waves. An unnecessary frequency is removed from a transmission signal, such as a modulated baseband signal, by a filter, and the resultant signal is amplified by an amplifier. The amplified transmission signal is fed to the antenna 19, and radiated as a radio wave (e.g. UHF band). On the other hand, a radio wave, which is received by the antenna 19, becomes a reception signal, and the reception signal is input to the receiver unit. In the receiver unit, the reception signal is amplified by an amplifier, and an unnecessary frequency is removed from the reception signal by a filter, and the resultant signal is demodulated by a demodulator. The demodulated reception signal is taken in as data of the RFID tag.

Figure 5:
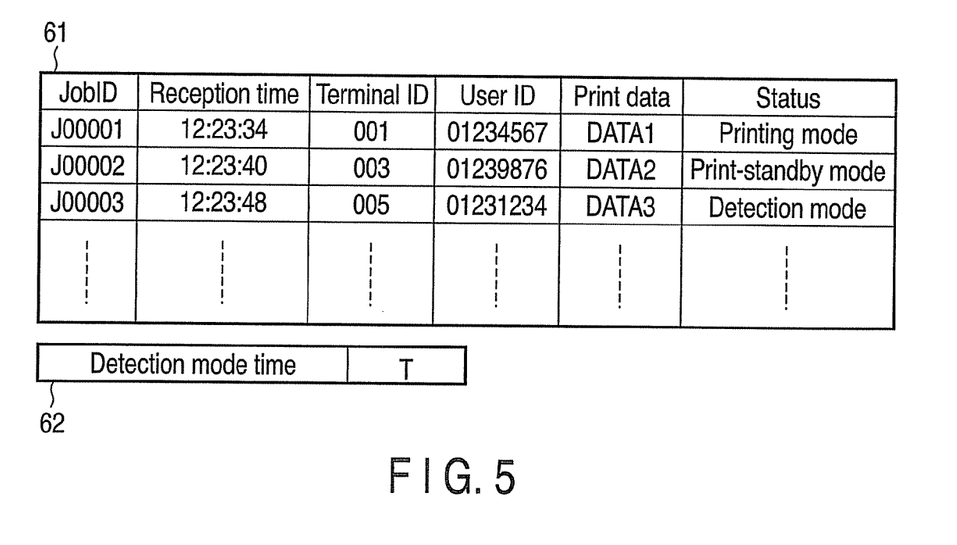
FIG. 5 shows major memory areas which are provided in a RAM shown in FIG. 4.

In the printer 1 having the above-described structure, a job management table 61 and a detection mode time memory 62, as shown in FIG. 5, are provided in the RAM 13.

The job management table 61 is an area for managing a print request from each user terminal 3 as a print job. The job management table 61 stores information such as a job ID, a reception time, a terminal ID, a user ID, print data and a status. The job ID is an identifier for identifying the print job. The reception time is a time at which the print job has been received by the printer 1. The terminal ID is an identifier for identifying the user terminal 3 which has issued the print job. The user ID is an identifier for identifying the user of the user terminal 3 which has issued the print job.

The status is information that is indicative of a state of the print job. The status of the print job is, for instance, "detection mode", "print-standby mode", or "printing mode". The "detection mode" is defined as the status of the print job during a time period from the reception of a print request command to the passing of a detection mode time T, which is set in the detection mode time memory 62. The "print-standby mode" is defined as the status of the print job during a time period from the passing of the detection mode time T to the completion of preparation for printing. The "printing mode" is defined as the status of the print job after the preparation for printing has been completed.

Thus, a print job in the status of "detection mode" is shorter in the elapsed time from the issuance of the print request command from the user terminal 3 than a print job in the status of "print-standby mode". The print job with a shorter elapsed time from the issuance of the print request command, that is, the print job in the status of "detection mode" is executed in preference to the print job in the status of "print-standby mode".

The detection mode time memory 62 is an area for storing a time T during which the print job is kept in the "detection mode". A user, who shares the network printer system, can set an arbitrary time T in the detection mode time memory 62 in consideration of the environment, such as offices, in which the system is constructed.

Referring to FIG. 6 to FIG. 9, the operation of the printer 1 will be described below.

If main power to the printer 1 is turned on, the CPU 11 initializes the components. In the initialization, the job management table 61 is cleared. A default value (e.g. 15 seconds) is preset in the detection mode time memory 62 as the detection mode time T. After the initialization, the printer 1 is set in the standby state. In the standby state, no radio wave is radiated from the antenna 19 of the RFID interrogator 18.

In the standby state, if the operation panel 17 is operated and a preset time change mode is selected, the CPU 11 accepts the input of the detection mode time T. If the detection mode time T is input by the numeral keys of the operation panel 17, the CPU 11 rewrites the value of the detection mode time memory 62 to the input detection mode time T.

In the standby state, the CPU 11 executes a RFID interrogator control process, a job receiving process and a printing process in parallel or in a time-sequential manner. To begin with, the RFID interrogator control process is described with reference to FIG. 6.

Figure 6:
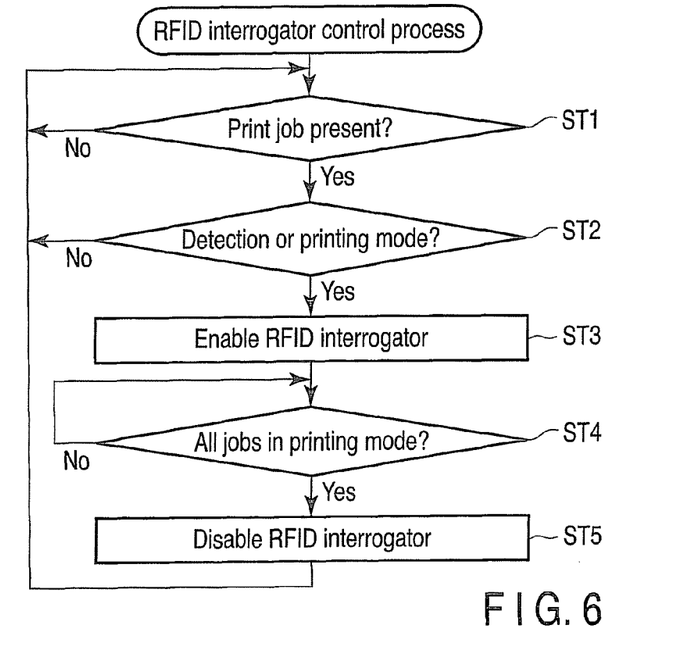
FIG. 6 is a flowchart illustrating a main procedure of an RFID interrogator control process which is executed by a CPU shown in FIG. 4.

In the standby state, the CPU 11 determines, in ST (act) 1, whether a print job stored in the job management table 61 is present. If no print job is present (No in ST1), the CPU 11 waits for storage of a print job.

In the case where a print job stored in the job management table 61 is present (Yes in ST1), the CPU 11 determines, in ST2, whether there is a print job in the status of "detection mode" or "print-standby mode". If there is no such print job (No in ST2), the CPU 11 waits for a print job in the status of "detection mode" or "print-standby mode" is stored.

If a print job in the status of "detection mode" or "print-standby mode" is stored in the job management table 61 (Yes in ST2), the CPU 11 enables the RFID interrogator 18 to radiate an inquiry radio wave in ST3. Thereafter, the CPU 11 waits, in ST4, until all the statuses of print jobs stored in the job management table 61 are updated to "printing mode".

If all the statuses of print jobs stored in the job management table 61 are updated to "printing mode" (Yes in ST4), the CPU 11 disables the RFID interrogator 18, in ST5, to stop the radiation of the inquiry radio wave. Thereafter, the CPU 11 waits until a print job in the status of "detection mode" or "print-standby mode" is stored again in the job management table 61 (ST1, ST2).

Thus, while at least one print job in the status of "detection mode" or "print-standby mode" is being stored in the job management table 61, the inquiry radio wave is radiated from the antenna 19 to the RFID tag. On the other hand, when no print job is stored in the job management table 61 or when all the statuses of print jobs that are stored are "printing mode", no inquiry radio wave is radiated from the antenna 19.

The expectable range of reach of the inquiry radio wave is, for example, several meters from the antenna 19 in the case of the UHF band. If the RFID tag comes within this range, the RFID tag responds and the data stored in the memory of the IC chip 52 is read by the RFID interrogator 18 non-contactly. Accordingly, if the user, who carries the identification card 5 incorporating the RFID tag, approaches the printer 1, the memory data of the RFID tag incorporated in the identification card 5, that is, the user ID, is read by the RFID interrogator 18. In this case, the RFID interrogator 18 functions as a user detector which detects the user ID (user identifier) of the approaching user.

Figure 7:
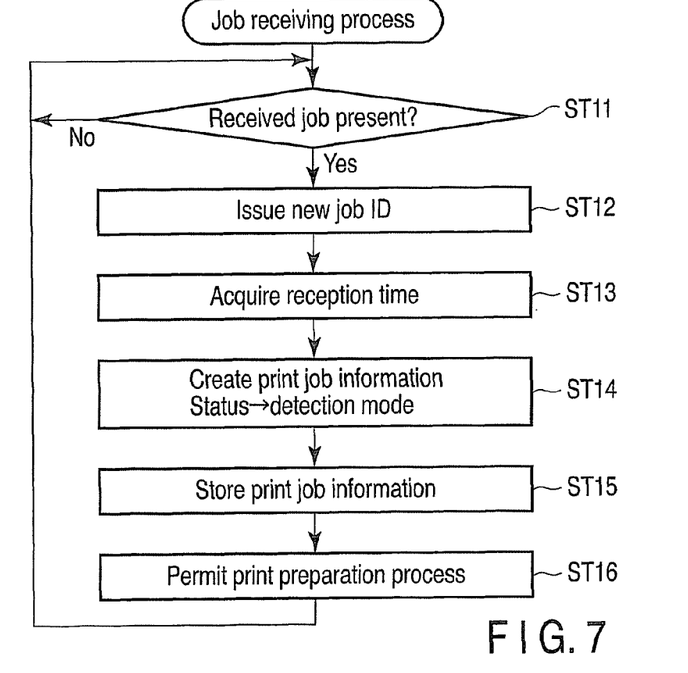
FIG. 7 is a flowchart illustrating a main procedure of a job receiving process which is executed by the CPU shown in FIG. 4.

Referring to FIG. 7, the job receiving process will be described below.

In the standby state, the CPU 11 waits for reception of a print job in the form of a print request command in ST11. If the print request command is transmitted from one of the user terminal 3, this command is supplied to the printer 1 via the server 2. When the data received via the communication interface 15 is a print request command from any one of the user terminals 3, the CPU 11 determines that a print job is received (Yes in ST11).

In ST12, the CPU 11 issues a new job ID for the received print job. In ST13, the CPU 11 acquires the present time, which is measured by the timer module 14, as the reception time of the print job. In ST14, the CPU 11 creates print job information constituted by the job ID and the reception time, as well as the terminal ID 31, user ID 32 and print data 33, which serve as the print request command. At this time, the status is set to be "detection mode".

If the print job information is created, the CPU 11, in ST15, stores the print job information in the job management table 61. In ST16, the CPU 11 starts the print preparation process for the print job. Subsequently, each time a print job is received, the CPU 11 repeats the execution of the process of ST12 to ST16. In this case, the job management table 61 functions as a job memory which stores the print job (image formation job), which is received from the user terminal 3, in association with the user ID (user identifier) which identifies the user of the user terminal 3.

Figure 8:
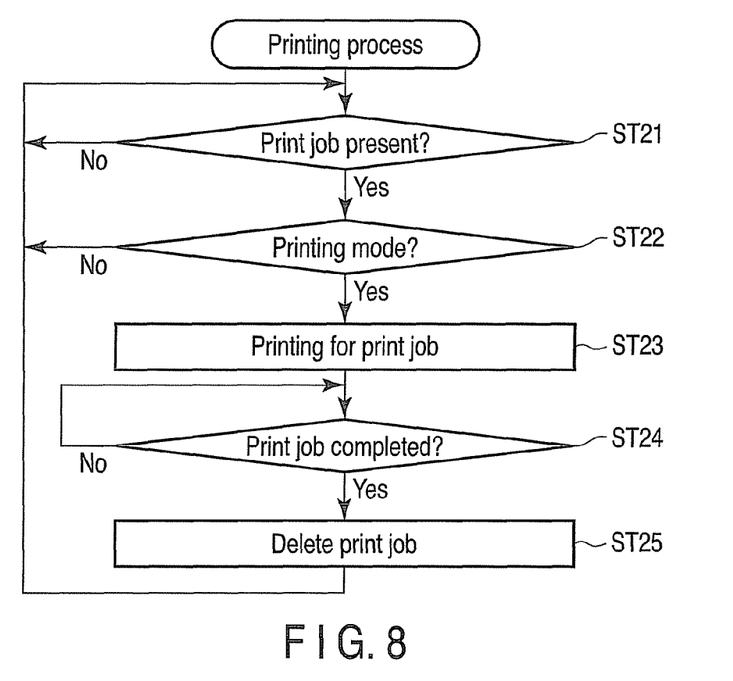
FIG. 8 is a flowchart illustrating a main procedure of a printing process which is executed by the CPU shown in FIG. 4.

The printing process will be described with reference to FIG. 8.

In the standby state, the CPU 11 determines, in ST21, whether a print job stored in the job management table 61 is present. If no print job is present (No in ST21), the CPU 11 waits until a print job is stored.

If a print job is present in the job management table 61 (Yes in ST21), the CPU 11 determines, in ST22, whether the print job is in the status of "printing mode". If there is no such print job (No in ST22), the CPU 11 waits until a print job in the status of "printing mode" is stored.

If a print job in the status of "printing mode" is present in the job management table 61 (Yes in ST22), the CPU 11 executes this print job in ST23. Specifically, the CPU 11 controls the print unit 16 to form an image corresponding to the print data of this print job, on a print medium such as paper.

In ST24, the CPU 11 waits for completion of the print job. If the print job is completed (Yes in ST24), the CPU 11 deletes the print job from the job management table 61 in ST25. Subsequently, the CPU 11 determines whether another print job in the status of "printing mode" is present in the job management table 61 (ST21, ST22). If such another print job is present, this print job is further executed (ST23).

The CPU 11 executes print jobs until there is no longer a print job in the status of "printing mode" in the job management table 61. If there is no long a print job in the status of "printing mode", the CPU 11 waits until there occurs a print job in the status of "printing mode" again.

Figure 9:
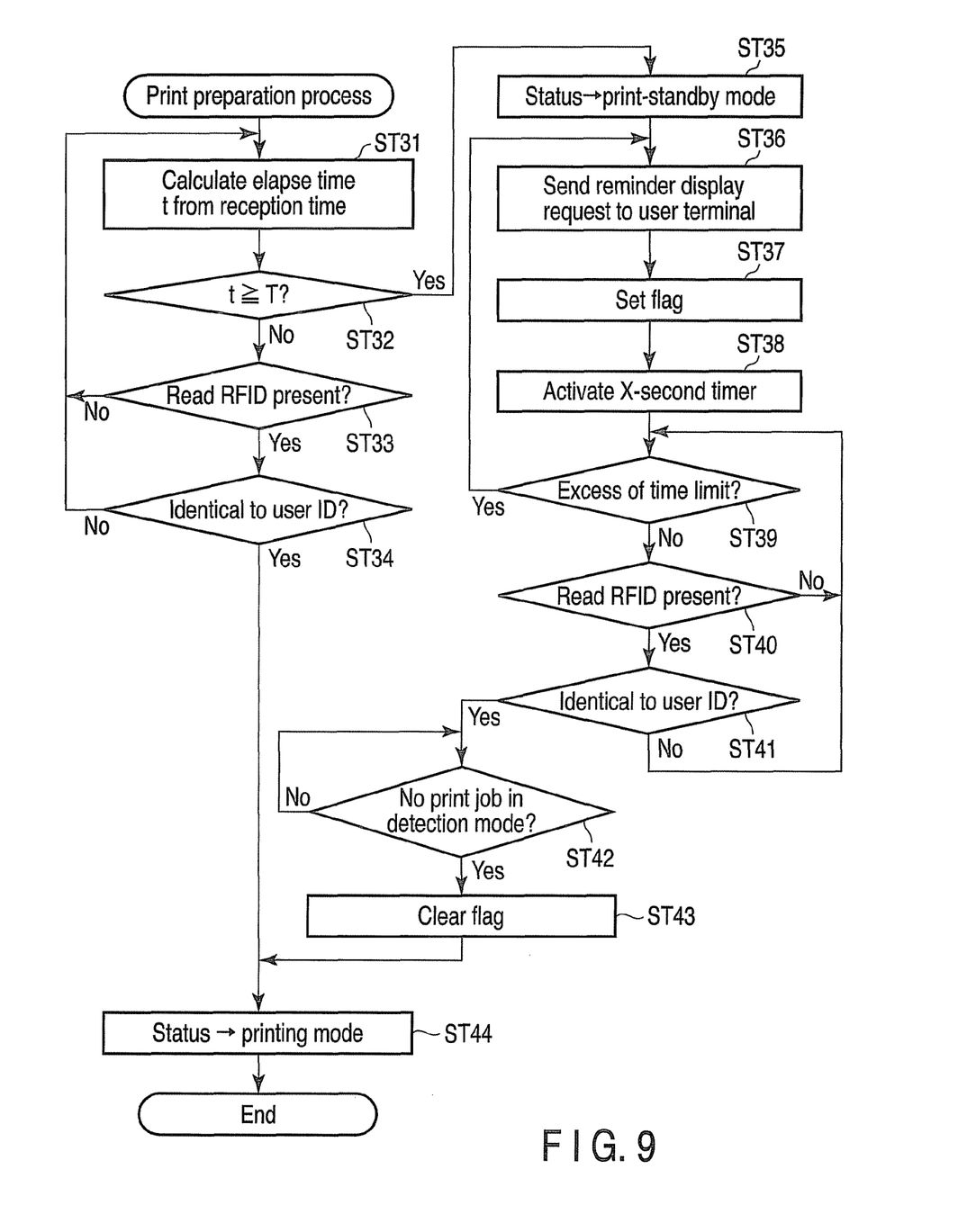
FIG. 9 is a flowchart illustrating a main procedure of a print preparation process which is executed by the CPU shown in FIG. 4.

Referring to FIG. 9, the print preparation process will be described.

The CPU 11 executes the print preparation process individually for print jobs in the status of "detection mode" or "print-standby mode", which are among the print jobs stored in the job management table 61.

To start with, in ST31, the CPU 11 calculates an elapsed time t from the reception time of a print job that is an object of processing. In ST32, the CPU 11 determines whether the elapsed time t exceeds the detection mode time T that is stored in the detection mode time memory 62. If the elapsed time t is less than the detection mode time T, (No in ST32), the CPU 11 determines, in ST33, whether the RFID interrogator 18 has read a user ID from the RFID tag. If the user ID has not been read (No in ST33), the process returns to ST31.

If the RFID interrogator 18 has read a user ID from the RFID tag (Yes in ST33), the CPU 11 determines, in ST34, whether the user ID is identical to the user D of the print job that is the object of processing. In the case of disagreement (No in ST34), the process returns to ST31.

If the user ID that is read by the RFID interrogator 18 is identical to the user ID of the print job that is the object of processing (Yes in ST34), the CPU 11 updates, in ST40, the status of the print job from "detection mode" to "printing mode". Thus, the print preparation process for this print job is completed.

On the other hand, if the elapsed time t is not less than the detection mode time T (Yes in ST32), the CPU 11 updates, in ST35, the status of the print job that is the object of processing from "detection mode" to "print-standby mode". In ST36, the CPU 11 performs a control of sending a reminder display request for requesting confirmation of a print job, to the user terminal 3 which is identified by the terminal ID of the print job. The information of the reminder display request is sent from the communication interface 15 to the associated user terminal 3 via the network 4. As a result, the display unit of the user terminal 3 displays a message indicating that a printed matter has not been output for a predetermined period of time after the request.

This message is displayed in order to remind the user to go for a printed matter (collect a result of image formation) when the user forgot presence of the print request and printing has been kept waiting. Then, the CPU 11 sets a confirmation flag in ST37, and activates a timer for a time limit of x seconds in ST38. When the CPU 11 detects an excess of the time limit of x seconds (Yes in ST39), the process returns to ST36 to send the reminder display request again.

When an excess of the time limit of x seconds is not detected (No in ST39), the CPU 11 determines, in ST40, whether the RFID interrogator has read a user ID from an RFID tag, and waits until the user ID is read, by repeatedly executing ST39 and ST40. If the user ID is read (Yes in ST40), the CPU 11 determines, in ST41, whether this user ID is identical to the user ID of the print job that is the object of processing. When the user ID is not identical (No in ST41), the process returns to ST39.

If the user ID that is read by the RFID interrogator 18 is identical to the user ID of the print job that is the object of processing (Yes in ST41), the CPU 11 determines, in ST42, whether another print job in the status of "detection mode" is present in the job management table 61. If another print job in the status of "detection mode" is present (No in ST42), the CPU 11 waits until there is no longer a print job in the status of "detection mode".

If no other print job in the status of "detection mode" is present in the job management table 61 (Yes in ST42), the CPU 11 clears, in ST43, the confirmation flag, and updates, in ST44, the status of the print job that is the object of processing from "detection mode" to "printing mode". Thus, the print preparation process for this print job is completed.

In this case, the CPU 11 constitutes an elapsed time calculator (ST31) which calculates the elapsed time t from the reception time of each of print jobs (image formation jobs) which are stored in the job management table 61 (job memory); a time determination unit (ST32) which determines whether the elapsed time t, which is calculated by the elapsed time calculator (ST31), is less than the detection mode time T, with respect to the print job (image formation job) which is associated with the user ID (user identifier) that is detected by the RFID interrogator 18 (user detector); a first image forming control unit (ST44, ST21 to ST23) which executes the print job (image formation job) which is associated with the user ID (user identifier) that is detected by the RFID interrogator 18 (user detector), if the time determination unit (ST32) has determined that the elapsed time t is less than the detection mode time T; an other-job monitor (ST42) which determines whether another job (image formation job), whose elapsed time t that is calculated by the elapsed time calculator (ST31) is less than the detection mode time T, is stored in the job management table 61 (job memory), if the time determination unit (ST32) has determined that the elapsed time t is not less than the detection mode time T; and a second image forming control unit (ST44, ST21 to ST23) which executes the print job (image formation job) which is associated with the user ID (user identifier) that is detected by the RFID interrogator 18 (user detector), on condition that the other-job monitor (ST42) has determined that another job (image formation job), whose elapsed time t is less than the detection mode time T, is not stored.

In addition, the CPU 11 constitutes a job search unit (ST32) which searches for an image formation job among print jobs (image formation jobs) stored in the job management table 61 (job memory), whose associated user ID (user identifier) is not detected by the RFID interrogator 18 (user detector), and whose elapsed time t that is calculated by the elapsed time calculator (ST31) reaches the detection mode time T; and a time passage reporting unit (ST36) which reports, if the associated print job (image formation job) is detected by the job search unit (ST32), that a printed matter has not been output for a predetermined period of time after the request, to the user terminal 3 serving as a transmission source of this print job (image formation job).

Figure 10:
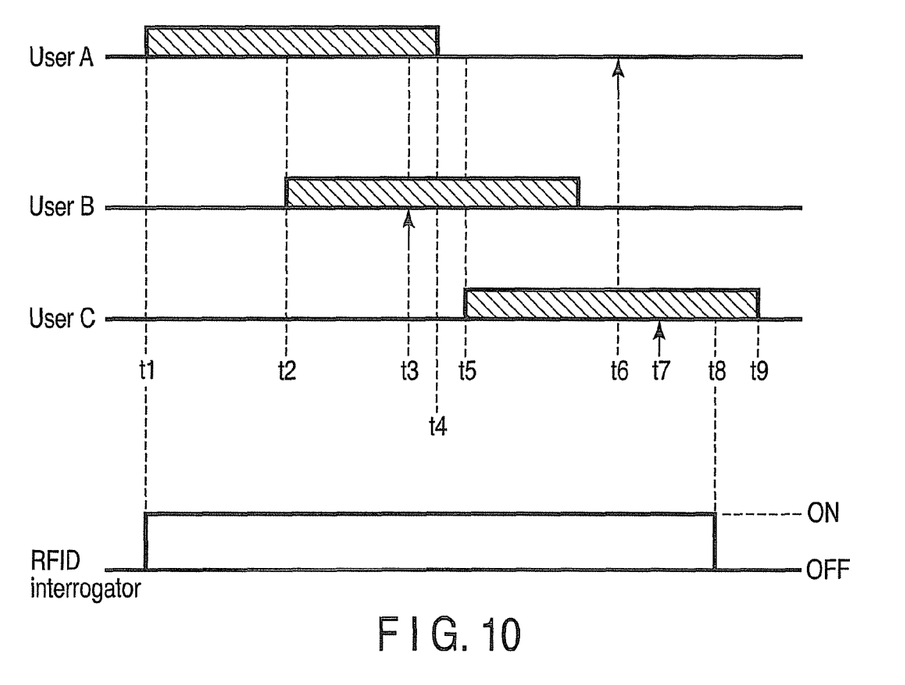
FIG. 10 is a time chart showing an operation sequence of the network printer system shown in FIG. 1.

Assume now the case in which three users A, B and C use different user terminals 3*a*, 3*b* and 3*c*, and the users A, B and C issued print requests at the timing shown in FIG. 10. Specifically, the user A issued a print request at time point t1, the user B issued a print request at time point t2, and the user C issued a print request at time point t5. In FIG. 10, the time t progresses from the left side to the right side. A hatched region R indicates a detection mode time T.

To start with, it is assumed that at time point t1, the user A, who logged in to the user terminal 3a, issued a print request. In this case, the print request is stored in the job management table 61 as a print job (hereinafter referred to as "print job A") which is associated with the user ID of the user A. The status of the print job A is "detection mode". Since the print job of the status of "detection mode" has been stored in the job management table 61, an inquiry radio wave is radiated from the RFID interrogator 18.

Subsequently, it is assumed that at time point t2, the user B, who logged in to the user terminal 3b, issued a print request. Then, this print request is stored in the job management table 61 as a print job (hereinafter referred to as "print job B") which is associated with the user ID of the user B. The status of the print job B is "detection mode". At this time point, since the elapsed time t from the issuance of the print request of the user A has not passed over the detection mode time T, the status of the print job A is also the "detection mode". In addition, the RFID interrogator 18 continues its operation, and the inquiry radio wave of the tag is being radiated.

Assume that the user B immediately went for a printed matter that is a print result and approached the printer 1. It is assumed that at time point t3, the data (user ID) of the RFID tag, which is incorporated in the identification card 5 that is carried by the user B, was read by the RFID interrogator 18. At this time point t3, the elapsed time t from the reception time of the print job B is within the detection mode time T. Thus, the status of the print job B is immediately updated from "detection mode" to "printing mode". As a result, the print unit 16 of the printer 1 operates to print out the print data of the print job B. Hence, the user B, who approached the printer 1, can immediately receive his/her own printed matter.

It is assumed that the user A does not approach the printer 1 until time point t4 at which the elapsed time t from the reception time of the print job A reaches the detection mode time T. In this case, at time point t4, the status of the print job A is updated from "detection mode" to "print-standby mode". In addition, a reminder display request is transmitted from the printer 1 to the user terminal 3a. Thereby, the display unit of the user terminal 3a displays a message indicating that a printed matter has not been output for a predetermined period of time after the print request.

It is assumed that at time point t5, the user C, who logged in to the user terminal 3c, issued a print request. Then, this print request is stored in the job management table 61 as a print job (hereinafter referred to as "print job C") which is associated with the user ID of the user C. The status of the print job C is "detection mode". In addition, the RFID interrogator 18 continues its operation, and the inquiry radio wave of the tag is being radiated.

Assume that the user A went for the printed matter and approached the printer 1. It is also assumed that at time point t6, the data (user ID) of the RFID tag, which is incorporated in the identification card 5 that is carried by the user A, was read by the RFID interrogator 18. At this time point t6, since the elapsed time t from the reception time of the print job A has passed over the detection mode time T, the status of the print job A is "print-standby mode". On the other hand, at time point t6, since the elapsed time t from the reception time of the print job C is within the detection mode time T, the status of the print job C is "detection mode". Accordingly, the print job A is not executed. The RFID interrogator 18 continues its operation, and the inquiry radio wave of the tag is being radiated.

It is assumed that at time point t7 prior to time point t9 at which the elapsed time t from the reception time of the print job C reaches the detection mode time T, the user C approached the printer 1 and the data (user ID) of the RFID tag, which is incorporated in the identification card 5 that is carried by the user C, was read by the RFID interrogator 18. At this time point t7, since the elapsed time t from the reception time of the print job C is within the detection mode time T, the status of the print job C is immediately updated from "detection mode" to "printing mode". As a result, the print unit 16 of the printer 1 operates to print out the print data of the print job C. Hence, the user C, who approached the printer 1, can immediately receive his/her own printed matter.

Thereafter, it is assumed that the print output of the print job C is finished at time point t8. Then, there is no longer a print job in the status of "detection mode" in the job management table 61. Thus, the status of the print job A, whose associated user ID has already been detected, is updated from "print-standby mode" to "printing mode". As a result, the print unit 16 of the printer 1 operates to print out the print data of the print job A. Hence, the user A, who approached the printer 1, can receive his/her own printed matter. At this time, since there is no longer a print job in the status of "detection mode" or "print-standby mode" in the job management table 61, the radiation of the inquiry radio wave from the RFID interrogator 18 is stopped.

As is clear from the comparison between the user A and user C in FIG. 10, the user A and user C approach the printer 1 almost at the same time. The user ID of the user A is detected by the RFID interrogator 18 slightly earlier than the user ID of the user C. However, as regards the user A, the elapsed time t from the issuance of the print request has already passed over the preset detection mode time T. On the other hand, as regards the user C, the elapsed time t from the issuance of the print request has not yet reached the detection mode time T.

In this case, in the printer 1, the print job of the user C is executed earlier than the print job of the user A, despite the user ID of the user C being detected later. After the print job of the user C is completed, the print job of the user A is executed.

According to the embodiment described above, when the user ID of the user, whose print job has a shorter elapsed time t from reception, is detected, the print job of this user is preferentially executed. Thus, the user, who issued a print request of a printed matter with urgency and immediately went to the printer 1 in order to take the printed matter, can immediately receive the printed matter. Therefore, the wait time of such a user can surely be reduced, and the printer 1 with high usability can be provided.

A modification of the above-described embodiment of the invention is described with reference to FIG. 11 and FIG. 12. In this modification, a RFID interrogator control process, which is different from the RFID interrogator control process of the first embodiment that has been described with reference to FIG. 1 to FIG. 10, is executed. In the other respects, the hardware structure and software structure of the modification are the same as those of the above-described embodiment, so a description thereof is omitted by reference to FIGS. 1 to 5 and FIGS. 7 to 9.

Figure 11:
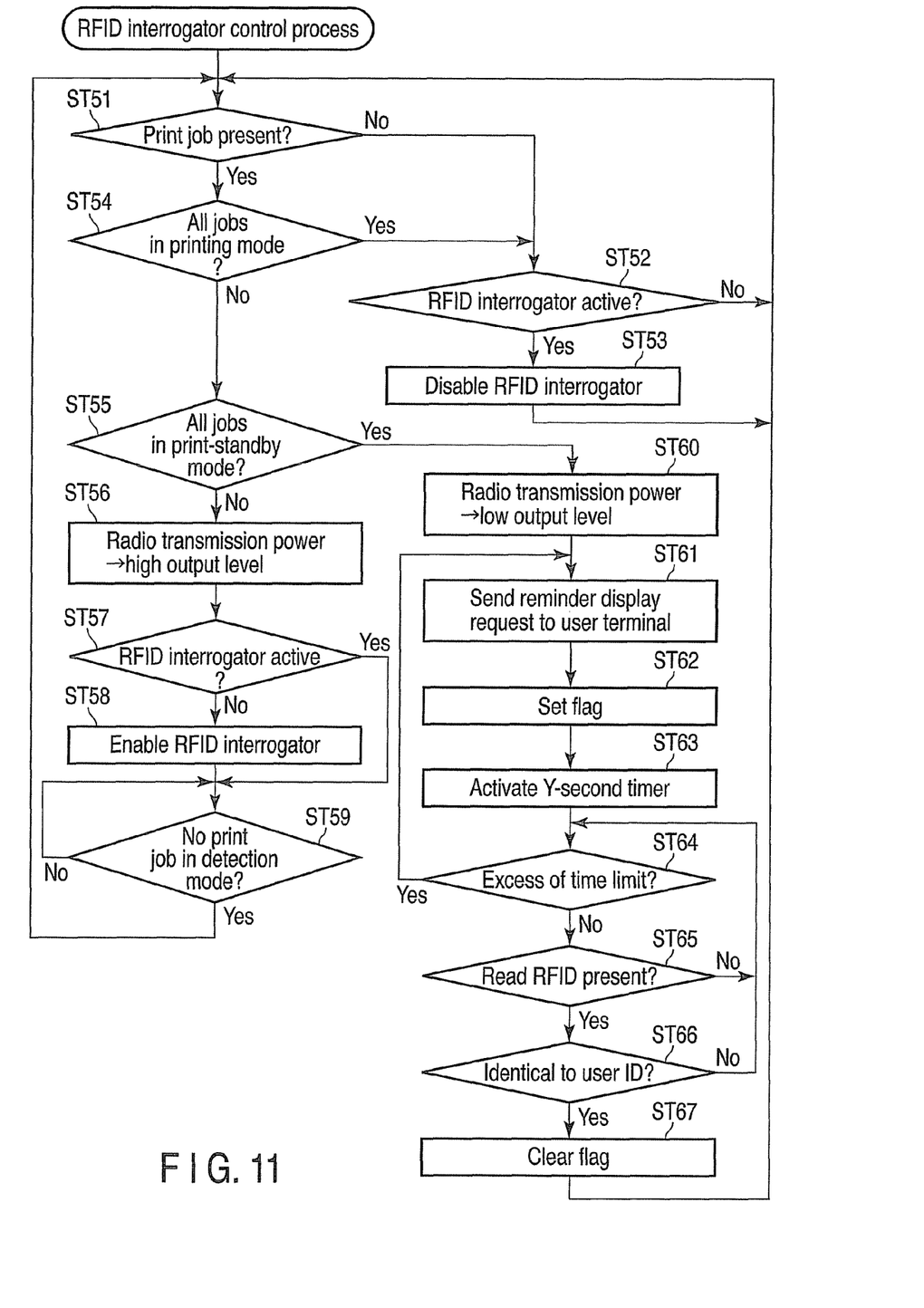
FIG. 11 is a flowchart illustrating a modification of the RFID interrogator control process which is illustrated in FIG. 6.

FIG. 11 illustrates the RFID interrogator control process of the modification. In the standby state, the CPU 11 determines, in ST51, whether a print job is present in the job management table 61. If no print job is stored (No in ST51), the CPU 11 determines, in ST52, whether the RFID interrogator 18 is active and radiating an inquiry radio wave. If the RFID interrogator 18 is radiating no inquiry radio wave (No in ST52), the CPU 11 waits until a print job is stored in the job management table 61. In the case where the RFID interrogator 18 is radiating an inquiry radio wave (Yes in ST52), the CPU 11 disables the RFID interrogator 18 in ST53. Thereafter, the CPU 11 waits until a print job is stored in the job management table 61.

In the case where a print job is present in the job management table 61 (Yes in ST51), the CPU 11 checks the statuses of all print jobs in ST54. If all statuses are "printing mode" (Yes in ST54), the process advances to ST52. Specifically, the CPU 11 determines whether the RFID interrogator 18 is emitting the inquiry radio wave. In the case where the inquiry radio wave is being radiated, the CPU 11 disables the RFID interrogator 18.

If at least one print job in the status of "detection mode" or "print-standby mode" is stored in the job management table 61 (No in ST54), the CPU 11 determines, in ST55, whether all the statuses of print jobs stored in the job management table 61 are "print-standby mode". If all the statuses of print jobs are not "print-standby mode", that is, if at least one print job in the status of "detection mode" is present in the job management table 61 (No in ST55), the CPU 11 sets the radio wave transmission power of the RFID interrogator 18 at a high output level in ST56. In ST57, the CPU 11 determines whether the RFID interrogator 18 is active and radiating the inquiry radio wave. In the case where the inquiry radio wave is not radiated (No in ST57), the CPU 11 enables the RFID interrogator 18 to radiate the inquiry radio wave in ST58.

Thereafter, the CPU 11 waits until there is no longer a print job in the status of "detection mode" in the job management table 61. If there is no longer a print job in the status of "detection mode" in the job management table 61 (Yes in ST59), the CPU 11 returns to the process of ST51.

On the other hand, in the case where all the statuses of print jobs stored in the job management table 61 are "print-standby mode" (Yes in ST55), the CPU 11 sets the radio wave transmission power of the RFID interrogator 18 at a low output level in ST60. Thereafter, the CPU 11 performs, in ST61, a control of sending a reminder display request for requesting confirmation of a print job, to the user terminal 3 which is identified by the terminal ID of the print job. The information of the reminder display request is sent from the communication interface 15 to the associated user terminal 3 via the network 4. As a result, the display unit of the user terminal 3 displays a message indicating that a printed matter has not been output for a predetermined period of time after the request.

This message is displayed in order to remind the user to go for a printed matter (collect a result of image formation) when the user forgot presence of the print request and printing has been kept waiting. Then, the CPU 11 sets a confirmation flag in ST62, and activates a timer for a time limit of Y seconds in ST63. When the CPU 11 detects an excess of the time limit of Y seconds (Yes in ST64), the process returns to ST61 to send the reminder display request again.

When an excess of the time limit of Y seconds is not detected (No in ST64), the CPU 11 determines, in ST65, whether the RFID interrogator 18 has read a user ID from an RFID tag, and waits until the user ID is read, by repeatedly executing ST64 and ST65. If the user ID is read (Yes in ST65), the CPU 11 determines, in ST66, whether this user ID is identical to the user ID of the print job that is the object of processing. When the user ID is not identical (No in ST41), the process returns to ST64.

If the user ID that is read by the RFID interrogator 18 is identical to the user ID of the print job that is the object of processing (Yes in ST66), the CPU 11 returns to the process of ST51.

In the case where the status of a print job stored in the job management table 61 is "detection mode", the elapsed time t from the reception time of this print job is within the detection mode time T. On the other hand, in the case where all the statuses of print jobs stored in the job management table 61 are "print-standby mode", the elapsed time t from the reception time of each of the print jobs has passed over the detection mode time T. The expectable range of reach of the tag inquiry radio wave, which is radiated from the antenna 19, becomes greater in the case where the radio wave transmission power of the RFID interrogator 18 is set at a high output level, than in the case where the radio wave transmission power of the RFID interrogator 18 is set at a low output level.

In the meantime, in this modification, the amplifier in the transmitter unit of the RFID interrogator 18 is a variable amplifier. The CPU 11 controls the RFID interrogator 18 so that the amplification factor of this variable amplifier becomes higher in the case where the radio wave transmission power of the RFID interrogator 18 is set at the high output level, than in the case where the radio wave transmission power of the RFID interrogator 18 is set at the low output level.

The CPU 11 constitutes an output control unit (ST51 to ST60) which performs a control of making higher the output power of the inquiry radio wave when a print job (image formation job), whose elapsed time t that is calculated by the elapsed time calculator (ST31) is within the detection mode time T, is stored in the job management table 61 (job memory), than when such a print job is not stored.

Figure 12:
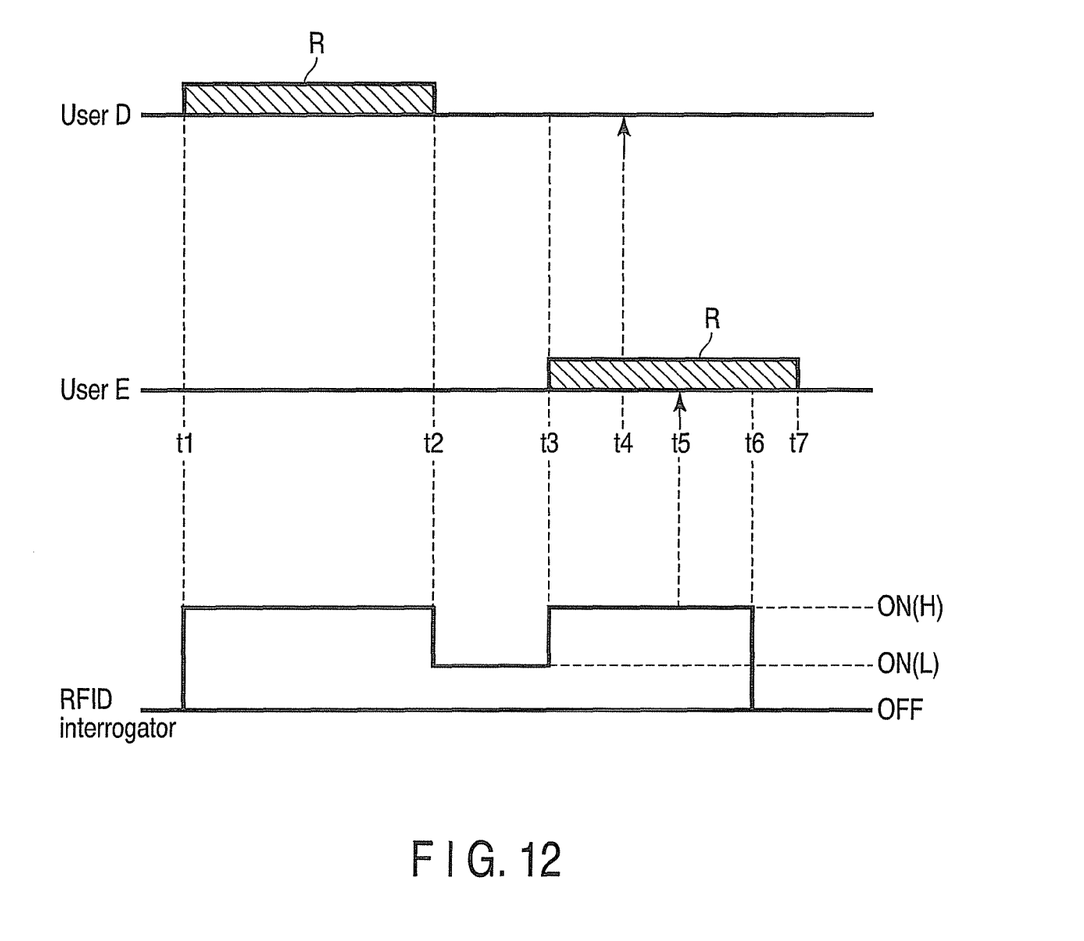
FIG. 12 is a time chart showing an operation sequence of the modification shown in FIG. 11.

Assume now the case in which two users D and E use different user terminals 3d and 3e, and the users D and E issued print requests at the timing shown in FIG. 12. Specifically, the user D issued a print request at a time point t1, and the user E issued a print request at a time point t3. In FIG. 12, the time t progresses from the left side to the right side. A hatched region R indicates a detection mode time T.

To start with, it is assumed that at time point t1, the user D, who logged in to the user terminal 3d, issued a print request. In this case, the print request is stored in the job management table 61 as a print job (hereinafter referred to as "print job D") which is associated with the user ID of the user D. The status of the print job D is "detection mode". Since the print job in the status of "detection mode" has been stored in the job management table 61, the power of the RFID interrogator 18 is set at a high output level (ON(H)).

It is assumed that the user D does not approach the printer 1 until time point t2 at which the elapsed time t from the reception time of the print job D reaches the detection mode time T. In this case, at time point t2, the status of the print job D is updated from "detection mode" to "print-standby mode". As a result, since all the statuses of print jobs in the job management table 61 are "print-standby mode", the power of the RFID interrogator 18 is switched to a low output level (ON(L)).

At this time, a reminder display request is transmitted from the printer 1 to the user terminal 3d. Thereby, the display unit of the user terminal 3d displays a message reporting that a printed matter has not been output for a predetermined period of time after the print request.

It is assumed that at time point t3, the user E, who logged in to the user terminal 3e, issued a print request. Then, this print request is stored in the job management table 61 as a print job (hereinafter referred to as "print job E") which is associated with the user ID of the user E. The status of the print job E is "detection mode". Thus, the power of the RFID interrogator 18 is switched again to the high output level (ON(H)).

Assume that the user D went for a printed matter and approached the printer 1. It is also assumed that at time point t4, the data (user ID) of the RFID tag, which is incorporated in the identification card 5 that is carried by the user D, was read by the RFID interrogator 18. At this time point t4, since the elapsed time t from the reception time of the print job D has passed over the detection mode time T, the status of the print job D is "print-standby mode". On the other hand, at time point t4, since the elapsed time t from the reception time of the print job E is within the detection mode time T, the status of the print job E is "detection mode". Thus, the print job D is not executed. Since the print job in the status of "detection mode" is stored, the power of the RFID interrogator 18 is kept at the high output level (ON(H)).

It is assumed that at time point t5 prior to time point t7 at which the elapsed time t from the reception time of the print job E reaches the detection mode time T, the user E approached the printer 1 and the data (user ID) of the RFID tag, which is incorporated in the identification card 5 that is carried by the user E, was read by the RFID interrogator 18. At this time point t5, since the elapsed time t from the reception time of the print job E is within the detection mode time T, the status of the print job E is immediately updated from "detection mode" to "printing mode". As a result, the print unit 16 of the printer 1 operates to print out the print data of the print job E. Hence, the user E, who approached the printer 1, can immediately receive his/her own printed matter.

It is assumed that the print output of the print job E is finished at time point t6. Then, there is no longer any other print job in the status of "detection mode" in the job management table 61. Thus, the status of the print job D, whose associated user ID has already been detected, is updated from "print-standby mode" to "printing mode". As a result, the print unit 16 of the printer 1 operates to print out the print data of the print job D. Hence, the user D, who approached the printer 1, can receive his/her own printed matter. At this time, since there is no longer a print job in the status of "detection mode" or "print-standby mode" in the job management table 61, the radiation of the inquiry radio wave from the RFID interrogator 18 is stopped.

As shown in FIG. 12, the radio wave transmission power of the RFID interrogator 18 is set at the high output level, while the print job in the status of "detection mode" is stored in the job management table 61, that is, while the print job, with respect to which the elapsed time t from the reception time of the print job has not passed over the preset detection mode time T, is stored in the job management table 61. The expectable range of reach of the tag inquiry radio wave is greater during the period (t1 to t2, t3 to t6) in which the radio wave transmission power is set at the high output level, than during the period (t2 to t3) in which the radio wave transmission power is set at the low output level. In other words, the data of an RFID tag, which is remote from the antenna 19, can be read during the period (t1 to t2, t3 to t6) in which the radio wave transmission power is set at the high output level, than during the period (t2 to t3) in which the radio wave transmission power is set at the low output level.

Accordingly, in the case where the user E, who instructed the output of a printed matter with urgency, approached the printer 1 immediately after the issuance of the print request, the user ID is detected by the REID interrogator 18 even if the user E is at a relatively far position. The print job E is executed in preference to the print job D. Therefore, since the printing is already started when the user E approaches the printer 1, the wait time of the user, who instructed the output of a printed matter with urgency, can further be decreased.

Figure 13:
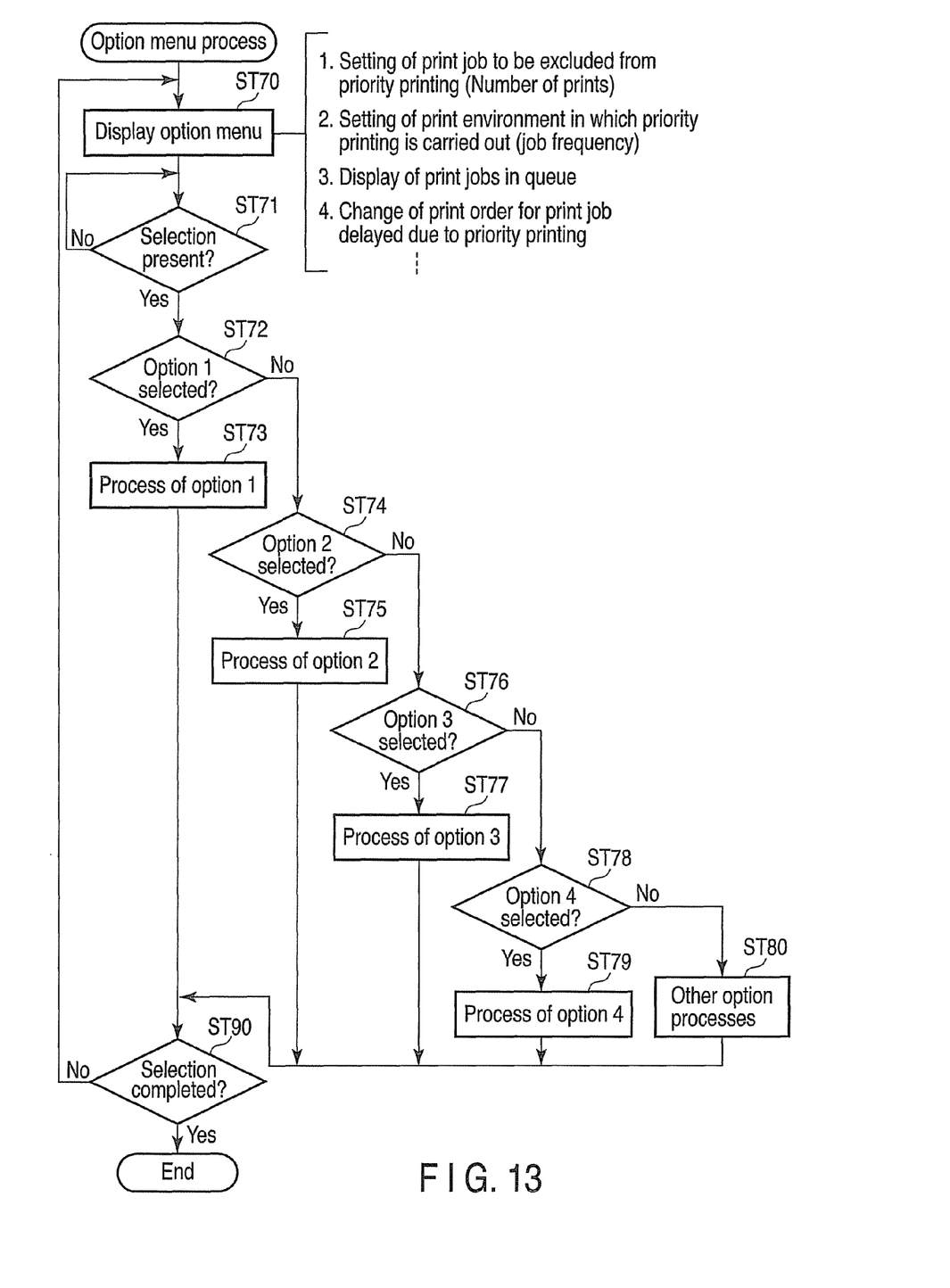
FIG. 13 is a flowchart showing an example of an option menu process which is performed upon an option menu operation using an operation panel shown in FIG. 4.

FIG. 13 shows an example of an option menu process which is performed upon an option menu operation using an operation panel shown in FIG. 4. This option menu process is performed to optimize the operation of the printer 1. When the CPU 11 starts the option menu process, the CPU 11 controls the operation panel 17, in ST70, to display an option menu. This option menu includes option items such as "1. Setting of print job to be excluded from priority printing (number of prints)", "2. Setting of print environment in which priority printing is carried out (job frequency)", "3. Display of print jobs in queue", "4. Change of print order for print job delayed due to priority printing". Then, the CPU 11 determines, in ST71, whether any selection made by the operation panel 17 is present. ST71 is repeated until the presence of a selection is detected. After detection of the selection, if the CPU 11 detects, in ST72, that the option 1 is selected, the CPU 11 performs a process of Option 1 in ST73. In the process of Option 1, the number of prints such as "100" is input from the operation panel 17. In this case, the CPU 11 sets a print job whose number of prints exceeds "100", as a print job to be excluded from priority printing. This implements an operation which prevents a start of executing a print job that requires a relatively short printing time from being delayed due to priority printing of a print job that requires an extremely long printing time.

When Option 1 is not selected, the process advances to ST74. If the CPU 11 detects, in ST74, that Option 2 is selected, the CPU 11 performs a process of Option 2 in ST75. In the process of Option 2, an upper limit of job frequency is input from the operation panel 17 to set an environment that is suitable for priority printing. In this case, the CPU 11 confirms the number of print jobs per unit time, which are stored in the job management table 61, as the job frequency, and permits the priority printing when the job frequency does not exceed the upper limit. Option 2 implements an operation which prevents a waiting time for printing of a print job from being extremely increased after the issuance of the print request by moving down the print order of the print job in an environment where there are many print jobs waiting for printing.

When Option 3 is not selected, the process advances to ST76. If the CPU 11 detects, in ST76, that Option 3 is selected, the CPU 11 performs a process of Option 3 in ST77. In the process of Option 3, the CPU 11 controls the operation panel 17 to display print jobs managed by the job management table 61 as a current queue list. Option 3 implements an operation in which a user, who has arrived at the printer 1, may confirm the print order of a print job corresponding to a user ID of the user.

When Option 4 is not selected, the process advances to ST78. If the CPU 11 detects, in ST76, that Option 4 is selected, the CPU 11 performs a process of Option 4 in ST79. In the process of Option 4, the operation panel 17 is operated to move up the print order of a print job corresponding to a user ID of a user who has arrived at the printer 1 and confirmed the print order of the print job in Option 3. In this case, the CPU 11 moves up the order of the print job in the job management table 61, on the basis of a move-up operation of the operation panel 17. Option 4 implements an operation in which a user who has arrived at the printer 1 may recover the print order of a print job which has been moved down.

If one or more other options are present, the process of each option is performed in ST80. After ST73, ST75, ST77, ST79, and ST80, the CPU 11 determines, in ST90, whether the operation panel 17 is operated to complete selection. If selection is not completed, ST70 is executed again. On the other hand, if the selection is completed, the CPU 11 finishes the option menu process. In addition, if any trouble such as sheet jam or the like occurs in the print unit 16, the priority printing described above is automatically cancelled.

The present invention is not limited to the above-described embodiment. Various modifications can be made without departing from the spirit of the invention.

For example, in the above-described embodiment, the user detector is provided as the RFID interrogator 18 which transmits the inquiry radio wave to the RFID tag of the identification card 5 that is carried by each user, and non-contactly read the user ID from the RFID tag which has responded to the inquiry radio wave. The user detector, however, is not limited to this example. For example, each user may carry a memory medium which includes a light-emitting element and periodically transmits the user ID as an optical signal from the light-emitting element. The image forming apparatus may be provided with a light-receiving element which receives the optical signal from the light-emitting element, and the user ID may be detected from the optical signal that is received by the light-receiving element.

In the above-described embodiment, until the elapsed time t from the reception time of a print job has passed over the preset detection mode time T, the status of this print job is set to be "detection mode". Thereafter, the status of the print job is set to be "print-standby mode". In this manner, the elapsed time from the reception time of the print job is managed. Alternatively, the elapsed time itself may be stored as information relating to print jobs. When a plurality of user IDs are detected, the elapsed times from the reception times of print jobs, which are associated with the respective user IDs, are compared. The print job with the shortest elapsed time may be executed preferentially. Thereby, the detection mode time T may be omitted.

The present invention is not limited to the network printer, and is also applicable to image forming apparatuses such as copiers.

Various modifications can be made by properly combining the structural elements disclosed in the embodiment. For example, some components may be omitted from all the components disclosed in the embodiment. Furthermore, components in different embodiments and modifications may properly be combined.

In the description of the present embodiment, the functions for implementing the present invention are prerecorded in the device. However, the present invention is not limited to this. Similar functions may be downloaded into the device from a network or a recording medium in which similar functions are stored may be installed in the device. The recording medium may be any form of medium such as CD-ROM in which programs can be stored and from which the device can read data. The functions obtained by the installation or downloading may be implemented in cooperation with the OS (Operating System) or the like inside the device.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image forming apparatus comprising:
    a job memory which stores each of image formation jobs, which are received from terminals, in association with a user identifier which identifies a user of a corresponding terminal;
    an image forming unit which executes the image formation jobs which are stored in the job memory;
    a user detector which detects a user identifier of each approaching user based on information transmitted from a memory medium carried by each user; and
    a controller which calculates, upon detection of plural user identifiers by the user detector, elapsed times from reception times of image formation jobs which are stored in the job memory in association with the user identifiers, compares the elapsed times, and controls the image forming unit to execute the image formation job with a shortest one of the elapsed times.

2. The image forming apparatus of claim 1, wherein the controller includes:
    a time determination unit which determines whether the elapsed time is within a preset time;
    a first image forming control unit which executes the image formation job which is associated with the user identifier, if the time determination unit determines that the elapsed time is within the preset time;
    an other-job monitor which determines whether another image formation job, the elapsed time of which is within the preset time, is stored in the job memory, if the time determination unit determines that the elapsed time has passed over the preset time; and
    a second image forming control unit which executes the image formation job which is associated with the user identifier, when the other-job monitor unit has determined that another image formation job, the elapsed time of which is within the preset time, is not stored in the job memory.

3. The image forming apparatus of claim 2, wherein the user detector is an interrogator which transmits an inquiry radio wave to an RFID tag which is carried by each of the users, and non-contactly reads the user identifier from the RFID tag which has responded to the inquiry radio wave, and
    the control unit includes an output control unit which executes control to make higher an output of the inquiry radio wave while the image formation job, the elapsed time of which is within the preset time, is being stored in the job memory, than when the image formation job, the elapsed time of which is within the preset time, is not stored in the job memory.

4. The image forming apparatus of claim 3, wherein the controller includes:
    a job search unit which searches for an image formation job, from among image formation jobs stored in the job memory, the elapsed time of which has passed over the preset time; and
    a time passage reporting unit which reports the passing of a predetermined time to the terminal serving as a transmission source of the image formation job if the image formation job is detected by the job search unit.

5. The image forming apparatus of claim 2, wherein the controller includes:
    a job search unit which searches for an image formation job, from among image formation jobs stored in the job memory, the elapsed time of which has passed over the preset time with the associated user identifier being not detected by the user detector; and a time passage reporting unit which reports the passing of a predetermined time to the terminal serving as a transmission source of the image formation job if the image formation job is detected by the job search unit.

6. The image forming apparatus of claim 5, wherein the time passage reporting unit is configured to remind collection of an image formation result by periodically reporting the passing of a predetermined time.

7. The image forming apparatus of claim 1, wherein the controller includes an operation unit which is operated by the user, and an option setting unit which performs option settings in accordance with an operation of the operation unit.

8. The image forming apparatus of claim 7, wherein the option setting unit is configured to perform an option process of setting an image formation job whose number of images exceeds a number input by the operation unit, as an image formation job to be excluded from priority execution.

9. The image forming apparatus of claim 7, wherein the option setting unit is configured to perform an option process of permitting a priority execution control in a job frequency which does not exceed an upper limit input by the operation unit.

10. The image forming apparatus of claim 7, wherein the option setting unit is configured to perform an option process of displaying a queue list of image formation jobs stored in the job memory.

11. The image forming apparatus of claim 7, wherein the option setting unit is configured to perform an option process of moving up the order of an image formation job corresponding to a user identifier detected by the user detector.

12. The image forming apparatus of claim 1, wherein the controller is configured to cancel a priority execution control if any trouble occurs in the image forming unit.

13. A control method of an image forming apparatus including a job memory which stores each of the image formation jobs, which are received from terminals, in association with a user identifier which identifies a user of a corresponding terminal; an image forming unit which executes the image formation jobs which are stored in the job memory, the method comprising:
   detecting a user identifier of each approaching user;
   calculating, upon detection of plural user identifiers, elapsed times from reception times of image formation jobs which are stored in the job memory in association with the user identifiers;
   comparing the elapse times; and
   controlling the image forming unit to execute the image formation job with a shortest one of the elapsed times.

14. The control method of claim 13, which further comprises determining, if the user identifier is detected by the user detector, whether an elapsed time from a reception time of the image formation job, which is associated with the user identifier, is within the preset time.

15. The control method of claim 14, which further comprises executing the image formation job which is associated with the user identifier, if the elapsed time is within the preset time.

16. The control method of claim 15, which further comprises determining whether another image formation job, whose elapsed time from the reception time is within the preset time, is stored in the job memory, if the elapsed time has passed over the preset time.

17. The control method of claim 16, which further comprises executing the image formation job which is associated with the user identifier, in a case where the other image formation job, whose elapsed time from the reception time is within the preset time, is not stored in the job memory.

18. The control method of claim 17, which further comprises executing, in a case where the other image formation job, whose elapsed time from the reception time is within the preset time, is stored in the job memory, the image formation job, which is associated with the user identifier, after the elapsed time passes over the preset time.

19. An image forming apparatus comprising:
   job memory means for storing each of image formation jobs, which are received from terminals, in association with a user identifier which identifies a user of a corresponding terminal;
   image forming means for executing the image formation jobs which are stored in the job memory means;
   user detection means for detecting a user identifier of each approaching user based on information transmitted from a memory medium carried by each user; and
   control means for calculating, upon detection of plural user identifiers by the user detection means, elapsed times from reception times of image formation jobs which are stored in the job memory means in association with the user identifiers, comparing the elapsed times, and controlling the image forming means to execute the image formation job with a shortest one of the elapsed times.

* * * * *